United States Patent Office 3,176,040
Patented Mar. 30, 1965

3,176,040
NOVEL 2,2'-(ETHYLENEDIIMINO)-DI-1-BUTANOLS
Raymond George Wilkinson, Montvale, and Robert Gordon Shepherd, Ridgewood, N.J., assignors to American Cyanamid Company, New York, N.Y., a corporation of Maine
No Drawing. Filed Jan. 23, 1962, Ser. No. 168,241
Claims priority, application Great Britain, Feb. 7, 1961, 4,517/61
3 Claims. (Cl. 260—501)

This application is a continuation-in-part of our copending application Serial No. 77,034, filed December 20, 1960, now abandoned, which is a continuation-in-part of our application Serial No. 33,399, now abandoned, filed June 2, 1960. Applicants claim priority under their copending British application Serial No. 4,517, filed February 7, 1961 (License No. 261,516, dated January 27, 1961), for all that is disclosed therein which is not disclosed in their applications Serial No. 33,399 and Serial No. 77,034.

This invention relates to novel substituted alkylene diamines and, more particularly, is concerned with novel substituted N-(β- or γ-aminoalkyl)-aminoethanes which may be represented by the following general formula:

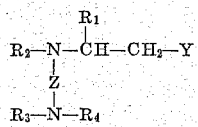

wherein $R_1$ is lower alkyl, $R_2$ and $R_3$ are hydrogen, lower alkyl or lower hydroxyalkyl, Y is halogen, hydroxyl, lower alkoxy, phenyl lower alkoxy, phenoxy, substituted phenoxy, pyridyl lower alkoxy, pyridoxy, benzoyloxy, substituted benzoyloxy, pyridylcarbonyloxy or lower alkanoyloxy, $R_4$ is lower alkyl, lower haloalkyl, lower hydroxyalkyl, lower alkoxy lower alkyl, phenyl lower alkoxy lower alkyl, phenoxy lower alkyl, substituted phenoxy lower alkyl, pyridyl lower alkoxy lower alkyl, pyridoxy lower alkyl, benzoyloxy lower alkyl, substituted benzoyloxy lower alkyl, pyridylcarbonyloxy lower alkyl or lower alkanoyloxy lower alkyl, and Z is an alkylene group of 2 or 3 carbon atoms. Suitable lower alkyl substituents may be, for example, methyl, ethyl, n-propyl, isopropyl, n-butyl, etc. Suitable lower hydroxyalkyl substituents may be, for example, β-hydroxyethyl, α-methyl-β-hydroxyethyl, α-ethyl-β-hydroxyethyl, α-isopropyl-β-hydroxyethyl, etc. Halogen is exemplified by chlorine and bromine. Lower alkoxy is exemplified by methoxy, ethoxy, n-propoxy, isopropoxy, n-butoxy, and the like. Suitable phenyl lower alkoxy groups may be, for example, benzyloxy, phenethoxy, etc. Suitable substituted phenoxy groups may be, for example, p-aminophenoxy, p-methoxyphenoxy, 2,4-dinitrophenoxy, 3,4-methylenedioxyphenoxy, etc. Pyridyl lower alkoxy is exemplified by α-pyridylmethoxy, β-pyridylmethoxy, β-(γ-pyridyl)ethoxy, and the like. Pyridoxy is exemplified by α-pyridoxy, β-pyridoxy and γ-pyridoxy. Suitable substituted benzoyloxy groups may be, for example, p-aminobenzoyloxy, p-methoxybenzoyloxy, p-chlorobenzoyloxy, 3,4-methylenedioxybenzoyloxy, etc. Pyridylcarbonyloxy is exemplified by nicotinoyloxy, isonicotinoyloxy and picolinoyloxy. Suitable lower alkanoyloxy groups may be, for example, acetyloxy, propionyloxy, isobutyryloxy, n-valeryloxy, etc. Lower haloalkyl is exemplified by β - bromethyl, α - methyl - β - chloroethyl, α - ethyl - β - bromoethyl, α - ethyl - β - chloroethyl, α - isopropyl - β - bromoethyl, and the like. Suitable lower alkoxy lower alkyl substituents may be, for example, β - methoxyethyl, α - methyl - β - ethoxyethyl, α - ethyl - β - methoxyethyl, α - ethyl - β - ethoxyethyl, α - isopropyl - β methoxyethyl, etc. Suitable phenyl lower alkoxy lower alkyl substituents may be, for example, α - methyl - β - benzyloxyethyl, α - ethyl - β - benzyloxyethyl, α - ethyl - β - phenethoxyethyl, etc. Suitable phenoxy lower alkyl substituents may be, for example, α - methyl - β - phenoxyethyl, α - ethyl - β - phenoxyethyl, etc. Suitable substituted phenoxy lower alkyl substituents may be, for example, α-methyl-β-(p-aminophenoxy)ethyl, α - ethyl - β - (2,4 - dinitrophenoxy)ethyl, α - ethyl - β - (p - methoxyphenoxy) ethyl, α - isopropyl - β - (3,4 - methylenedioxyphenoxy)ethyl, etc. Suitable pyridyl lower alkoxy lower alkyl groups may be, for example, α-methyl-β-(α-pyridylmethoxy)ethyl, α-ethyl-β-(β - pyridylmethoxy)ethyl, α-isopropyl-β-(γ-pyridylmethoxy)ethyl etc. Suitable pyridoxy lower alkyl groups may be, for example, α-methyl-β-(α-pyridoxy)ethyl, α-ethyl-β-(α-pyridoxy)ethyl, α-isopropyl-β-(β-pyridoxy)ethyl, etc. Suitable benzoyloxy lower alkyl groups may be, for example, α-methyl-β-benzoyloxyethyl, α-ethyl-β-benzoyloxyethyl, etc. Suitable substituted benzoyloxy lower alkyl groups may be, for example, α-methyl-β-(p-aminobenzoyloxy)ethyl, α-ethyl-β-(p-methoxybenzoyloxy)ethyl, α - ethyl - β - (p - chlorobenzoyloxy)ethyl, α - isopropyl - β - (3,4 - methylenedioxybenzoyl - oxy)ethyl, etc. Suitable pyridylcarbonyloxy lower alkyl groups may be, for example, α-methyl-β-(nicotinoyloxy)ethyl, α-ethyl-β-(isonicotinoyloxy)ethyl, α-isopropyl-β-(picolinoyloxy)ethyl, etc. Suitable lower alkanoyloxy lower alkyl groups may be, for example, α-methyl-β-acetyloxyethyl, α - ethyl - β - acetyloxyethyl, α - ethyl - β - propionyloxyethyl, -α - ethyl - β - (n - valeryloxy)ethyl, α - isopropyl - β - isobutyryloxyethyl, etc. The non-toxic acid-addition salts of the novel substituted N-(α- or γ-aminoalkyl)-aminoethanes of the present invention with both organic and inorganic acids are also included within the scope of the invention. This invention also relates to compositions of matter useful in the treatment of tuberculosis wherein the active ingredients are the novel substituted alkylene diamines or their non-toxic acid-addition salts of the present invention.

It is known that tuberculosis is a contagious disease which usually runs a protracted course, often lasting for years before death or recovery. Relapses are common. It is one of the most important causes of prolonged disability and chronic ill health. It is caused by the tubercle bacillus *Mycobacterium tuberculosis*. Human tuberculosis is usually caused either by the human strain or the bovine (cattle) strain of the bacillus. The bacillus is comparatively resistant. Tuberculosis is usually acquired either by the inhalation of droplets of infected sputum, either fresh or dried, or by the consumption of milk from tuberculous cows.

Until the discovery of streptomycin, it was impossible to attack the tubercle bacillus directly. Treatment was based on rest, nutrition, fresh air, good meals and collapse therapy; in other words on the recuperative powers of the body. The discovery of streptomycin ushered in a new era in the treatment of tuberculosis. Streptomycin, however, has a number of significant shortcomings, such as the fact that it is not always well tolerated and must be given by injection. Furthermore, the bacillus may become resistant to streptomycin so that it loses its therapeutic value. Para-aminosalicylic acid has also been found to be a weak antituberculous agent. However, when used with streptomycin, it reinforces the action of streptomycin and delays the appearance of resistant strains of the bacillus. Nicotinamide and pyrazinamide have also been tried but both of these compounds also have significant shortcomings.

The novel substituted N-(β- or γ-aminoalkyl)-aminoethanes and their non-toxic acid-addition salts of the present invention have been found to be highly useful in the treatment of tubercle bacilli infections when administered in amounts ranging from about 10 mg. to about 500 mg. per kilogram of body weight per day. Surprisingly, the known 2,2'-(ethylenediimino)-di-1-ethanol and 2,2,2',2'-(ethylenediimino)-tetra-1-ethanol are utterly devoid of such therapeutic activity.

The novel compounds of the present invention are, in general, white crystalline solids or colorless oil, soluble in lower alkanols and variably soluble in water, acetone, chloroform, ether, benzene, petroleum ether, and the like. The acid-addition salts of the novel compounds of the present invention are, in general, soluble in water and hot alkanols, but relatively insoluble in non-polar organic solvents such as benzene, ether, and the like.

The novel substituted alkylene diamines of the present invention, which are the therapeutically active ingredients of the novel compositions of the present invention, may be administered either in the form of the free bases or in the form of their non-toxic acid-addition salts. The inorganic acids which may be employed to prepare these acid-addition salts may be, for example, hydrochloric, hydrobromic, sulfuric, or nitric. The organic acids which may be employed to prepare these acid-addition salts may be, for example, benzoic, acetic, tartaric, citric, lactic, or para-aminosalicylic.

A dosage unit of the novel substituted alkylene diamines or their non-toxic acid-addition salts of the present invention comprises from about 10 mg. to about 500 mg. per kilogram of body weight per day. In the treatment of tuberculosis, such dosage units are employed that a total of from 0.6 g. to 30 g. of the substituted alkylene diamine or its acid-addition salt, for an adult patient, is administered orally in a 24-hour period. The preferred range for human adult patients is 2.5 to 10 grams of the alkylene diamine or its acid-addition salt in a 24-hour period given in dosage units of 0.5 to 2 grams. For instance, 5 tablets containing 0.5 gram each or 5 tablets containing 2 grams each may be employed in each 24-hour period with beneficial results.

A preferred dosage unit form is a tablet containing the novel substituted alkylene diamine or its non-toxic acid-addition salt as the therapeutically active ingredient. For adults, such tablets should contain from 0.5 to 2 grams of the alkylene diamine or its acid-addition salt. Of course, a tablet scored to be broken into dosage units such as previously described or a number of tablets to be taken at one time to constitute a dosage unit may also be employed. A second preferred dosage unit form is a capsule containing as the therapeutically active ingredient from 0.5 to 2 grams of the novel substituted alkylene diamine or its acid-addition salt. The capsule may be of either the hard or soft variety and may be made of any suitable capsule material which will disintegrate in the digestive tract. Examples of such encapsulating materials are gelatin and methyl cellulose.

Of course, the dosage unit forms of the novel substituted alkylene diamines or their non-toxic acid-addition salts of the present invention may also contain either inert or medically active materials. For instance, when the dosage unit form is a tablet or granules there may also be present various binders, fillers, or solid diluents. There may also be present various medically active materials such as, for instance, para-aminosalicylic acid or isonicotinic acid hydrazide. When the dosage unit form is a capsule it may contain, in addition to materials of the above type, a liquid carrier such as a fatty oil. And regardless of the dosage unit form, there may be present various flavors and excipients. Of course, any materials used in preparing the dosage unit forms must be pharmaceutically pure and substantially non-toxic in the amount employed.

The novel compounds of the present invention may be prepared in a variety of ways. Where N-($\beta$- or $\gamma$-aminoalkyl)-$\beta$-aminoethanol derivatives symmetrically substituted on the two nitrogen atoms are desired and $R_2$ and $R_3$ are hydrogen in the general formula set forth above, the interaction of an ethylene dihalide or a propylene dihalide with two equivalents of a $\beta$-(lower alkyl)-$\beta$-aminoethanol may conveniently be employed. Ordinarily, the reaction is carried out without a solvent since both of the reactants are liquids. However, the reaction may, if desired, be carried out in an inert solvent. An inorganic base such as magnesium oxide or calcium carbonate or a two-fold stoichiometric excess of the aminoethanol may be employed as an acid acceptor of the hydrogen halide formed during the reaction. The reaction is carried out over a period of time ranging from 10 minutes to 48 hours, and at a temperature ranging from room temperature to the reflux temperature of the reaction mixture. The novel compounds of this type may also be prepared by the interaction of an ethylenediamine or propylene diamine with two equivalents of a $\beta$-(lower alkyl)-$\beta$-haloethanol. This reaction may be carried out with or without an inert solvent since both of the reactants are liquids. In this method of preparing the novel compounds of this type, a stoichiometric excess of the haloethanol is not used but rather an acid acceptor of the hydrogen halide formed during the reaction is employed. Such acid acceptors may be, for example, sodium carbonate, potassium carbonate, pyridine, triethylamine, and the like. The reaction is carried out over a period of time ranging from 10 minutes to 48 hours, and at a temperature ranging from room temperature to the reflux temperature of the reaction mixture.

The N - ($\beta$ - aminoethyl)-$\beta$-aminoethanol derivatives which are symmetrically substituted on the two nitrogen atoms and wherein $R_2$ and $R_3$ are hydrogen in the general formula set forth above may be prepared by yet another method. This involves the reduction with lithium aluminum hydride of either the 2,2'-bis-(ethylenediimino)-di-(lower alkyl)carboxylic acids (or esters thereof) or the N,N'-bis-oxalyl derivatives of the appropriate $\alpha$-amino acids (or esters thereof) by introducing a solution of the above compounds in an inert solvent into a solution of a stoichiometric excess of lithium aluminum hydride also in an inert solvent at temperatures ranging from 0° to 100° C.

The above methods of preparation give rise to $\beta$-aminoethanol derivatives wherein $R_2$ and $R_3$ are hydrogen in the general formula set forth above. The conversion of $R_2$ and $R_3$ to methyl may be readily accomplished by treatment with formaldehyde and concentrated formic acid. The conversion of $R_2$ and $R_3$ to other lower alkyl groups or to a lower hydroxyalkyl group may be readily accomplished by treatment with an appropriate lower alkyl halide or alkylene oxide, respectively.

Where N-($\beta$- or $\gamma$-aminoalkyl)-$\beta$-aminoethanol derivatives not symmetrically substituted on the two nitrogen atoms are desired, stepwise preparative methods must be employed. For example, the interaction of an ethylene dihalide or a propylene dihalide with but one equivalent of a $\beta$-(lower alkyl)-$\beta$-aminoethanol or an N-(lower alkyl or lower hydroxyalkyl)-$\beta$-(lower alkyl)-$\beta$-aminoethanol gives rise to an intermediate $\beta$-haloethyl or $\gamma$-halopropylamine. This intermediate may then be reacted with an appropriate primary or secondary amine such as, for example, isopropylamine, N-methylisopropylamine, $\beta$-ethyl-$\beta$-aminoethanol, or N-($\beta$-hydroxyethyl)-$\beta$-ethyl-$\beta$-aminoethanol. Ordinarily, these reactions are carried out without a solvent since both of the reactants are liquids. However, the reaction may, if desired, be carried out in an inert solvent. Ordinarily, the reaction is carried out over a period of time ranging from 10 minutes to 48 hours and at a temperature ranging from room temperature to the reflux temperature of the reaction mixture. The novel compounds of this type may also be prepared by the interaction of an ethylenediamine or propylene diamine with but one equivalent of a $\beta$-(lower alkyl)-$\beta$-haloethanol. The resulting intermediate $\beta$-aminoethyl or $\gamma$-aminopropylamine may then be reacted with an appropriate alkyl halide such as, for example, isopropyl bromide, sec.-butyl chloride, and β-ethyl-β-bromoethanol. This reaction may be carried out with or without an inert solvent since both of the reactants are liquids. In this method of preparing the novel compounds of this type, an acid acceptor of the hydrogen halide formed during the reaction is employed. Such acid acceptors may be, for example, sodium carbonate, potassium carbonate, pyridine, triethylamine, and the like. Ordinarily the reaction is carried out over a period of time ranging from 10 minutes to 48 hours and at a temperature ranging from room temperature to the reflux temperature of the reaction mixture.

Alternatively, the unsymmetrically tetra-substituted derivatives may be prepared by the stepwise interaction of a disubstituted ethylenediamine or propylene diamine with but one equivalent each of an appropriate but different acid halide, anhydride, azide, or ester. The resulting diamide may be readily reduced to the corresponding diamine with lithium aluminum hydride under standard conditions such as set forth previously.

Where the above methods of preparation give rise to β-aminoethanol derivatives wherein $R_2$ or $R_3$ are hydrogen in the general formula set forth above, the conversion of $R_2$ or $R_3$ to methyl may be readily accomplished by treatment with formaldehyde and concentrated formic acid. The conversion of $R_2$ or $R_3$ to a lower alkyl group or to a lower hydroxyalkyl group may be readily accomplished by treatment with an appropriate lower alkyl halide or alkylene oxide, respectively.

Where N-(β- or γ-aminoalkyl)-β-aminoethyl halide derivatives are desired, the treatment of an appropriate N-(β- or γ-aminoalkyl)-β-aminoethanol derivative with a hydrohalic acid or a thionyl halide may conveniently be employed. Where the starting material is a diol and 4 molar equivalents of a hydrohalic acid or 2 molar equivalents of a thionyl halide are employed, then a dihalide is obtained. Ordinarily, the reaction with a hydrohalic acid such as hydrogen chloride or hydrogen bromide is carried out in an aqueous medium over a period of time ranging from one to six hours and at an elevated temperature ranging from 75° C. to the reflux temperature of the aqueous medium. The reaction with a thionyl halide such as thionyl chloride or thionyl bromide is ordinarily carried out in an inert solvent such as chloroform or carbon tetrachloride over a period of time ranging from 5 minutes to 24 hours and at a temperature ranging from room temperature to the reflux temperature of the reaction mixture.

Where N-(β- or γ-aminoalkyl)-β-aminoethyl ether derivatives symmetrically substituted on the two nitrogen atoms are desired and $R_2$ and $R_3$ are hydrogen in the general formula set forth above, the interaction of an ethylene dihalide or a propylene dihalide with two equivalents of a β-(lower alkyl)-β-aminoethyl ether may conveniently be employed. Suitable β-(lower alkyl)-β-aminoethyl ethers may be, for example, α-methyl-β-methoxyethylamine, α-methyl-β-benzyloxyethylamine, α-ethyl-β-(β-pyridylmethoxy)ethylamine, α-ethyl-β-phenoxyethylamine, α-ethyl-β(2,4-dinitrophenoxy)ethylamine, α-isopropyl-β-(α-pyridoxy)ethylamine, etc. Ordinarily, the reaction is carried out in an inert solvent with an inorganic base such as magnesium oxide or calcium carbonate as an acid acceptor of the hydrogen halide formed during the reaction. Alternatively, a two-fold stoichiometric excess of the aminoethyl ether may be employed as an acid acceptor. The reaction is carried out over a period of time ranging from 10 minutes to 48 hours and at a temperature ranging from room temperature to the reflux temperature of the reaction mixture. The novel compounds of this type may also be prepared by the interaction of an ethylene diamine or propylene diamine with two equivalents of a β-(lower alkyl)-β-haloethyl ether. Suitable β-(lower alkyl)-β-haloethyl ethers may be, for example, α-methyl-β-methoxyethyl chloride, α-methyl-β-benzyloxyethyl bromide, α-ethyl-β-phenoxyethyl chloride, α-ethyl-β-(p-methoxyphenoxy)ethyl bromide, α-ethyl-β-(α-pyridylmethoxy)ethyl chloride, α-isopropyl-β-(α-pyridoxy)ethyl bromide, etc. This reaction is ordinarily carried out in an inert solvent with an acid acceptor of the hydrogen halide formed during the reaction. Such acid acceptors may be, for example, sodium carbonate, potassium carbonate, pyridine, triethylamine, and the like. The reaction is carried out over a period of time ranging from 10 minutes to 48 hours, and at a temperature ranging from room temperature to the reflux temperature of the reaction mixture.

The above methods of preparation give rise to β-aminoethyl ether derivatives wherein $R_2$ and $R_3$ are hydrogen in the general formula set forth above. The conversion of $R_2$ and $R_3$ to methyl may be readily accomplished by treatment with formaldehyde and concentrated formic acid. The conversion of $R_2$ and $R_3$ to other lower alkyl groups or to a lower hydroxyalkyl group may be readily accomplished by treatment with an appropriate lower alkyl halide or alkylene oxide, respectively.

Where N-(β- or γ-aminoethyl)-β-aminoethyl ether derivatives not symmetrically substituted on the two nitrogen atoms are desired, stepwise preparative methods must be employed. For example, the interaction of an ethylene dihalide or a propylene dihalide with but one equivalent of a β-(lower alkyl)-β-aminoethyl ether gives rise to an intermediate β-haloethyl or γ-haloethylamine. This intermediate may then be reacted with an appropriate primary or secondary amine such as, for example, isopropylamine, N-methylisopropylamine, β-ethyl-β-aminoethanol, N-(β-hydroxyethyl)-β-ethyl-β-aminoethanol, α-methyl-β-methoxyethylamine, α-methyl-β-benzyloxyethylamine, α-ethyl-β - phenoxyethylamine, α-ethyl-β-(2,4-dinitrophenoxy)-ethylamine, α-ethyl-β-(γ-pyridylmethoxy)ethylamine, α-isopropyl-β-(α-pyridoxy)ethylamine, etc. Ordinarily, these reactions are carried out in an inert solvent over a period of time ranging from 10 minutes to 48 hours and at a temperature ranging from room temperature to the reflux temperature of the reaction mixture. The novel compounds of this type may also be prepared by interaction of an ethylene diamine or propylene diamine with but one equivalent of a β-(lower alkyl)-β-haloethyl ether. Suitable β-(lower alkyl)-β-haloethyl ether derivatives may be, for example, α-methyl-β-methoxyethyl chloride, α-methyl-β-benzyloxyethyl bromide, α-ethyl-β-phenoxyethyl chloride, α - ethyl - β - (p - methoxyphenoxy)ethyl bromide, α - isopropyl - β - (α - pyridoxy)ethyl chloride, etc. The resulting intermediate β-aminoethyl or γ-aminopropylamine may then be reacted with an appropriate alkyl halide such as, for example, isopropyl bromide, sec.-butyl chloride, β-ethyl-β-bromoethanol, α-methyl-β-methoxy-ethyl chloride, α-methyl-β-benzyloxyethyl bromide, α-ethyl-β-phenoxyethyl chloride, α-ethyl-β-(2,4-dinitrophenoxy)-ethyl bromide, α-isopropyl-β-(α-pyridoxy)ethyl chloride, etc. This reaction is ordinarily carried out in an inert solvent with an acid acceptor of the hydrogen halide formed during the reaction. Such acid acceptors may be, for example, sodium carbonate, potassium carbonate, pyridine, triethylamine, and the like. Ordinarily, the reaction is carried out over a period of time ranging from 10 minutes to 48 hours at a temperature ranging from room temperature to the reflux temperature of the reaction mixture.

Where the above methods of preparation give rise to β-aminoethyl ether derivatives wherein $R_2$ or $R_3$ are hydrogen in the general formula set forth above, the conversion of $R_2$ or $R_3$ to methyl may be readily accomplished by treatment with formaldehyde and concentrated formic acid. The conversion of $R_2$ or $R_3$ to a lower alkyl group or to a lower hydroxyalkyl group may be readily accomplished by treatment with an appropriate lower alkyl halide or alkylene oxide, respectively.

The N-(β- or γ-aminoalkyl)β-aminoethyl ether derivatives of the present invention may also be prepared by the treatment of an appropriate N-(β- or γ-aminoalkyl)-β-aminoethanol derivative with sodium hydride, followed by treatment of the sodio derivative with an alkyl halide. Where the starting material is a diol and two molar equivalents of sodium hydride and alkyl halide are employed, then a diether is obtained. On the other hand, where the starting material is a diol and one molar equivalent of sodium hydride and alkyl halide are employed, then a monoether is obtained. This monoether may be further treated with sodium hydride and a different alkyl halide to give a mixed diether. Ordinarily, the preparation of the intermediate sodio derivative is carried out in an inert solvent such as ether, toluene or benzene at the reflux temperature of the reaction mixture and over a period of time ranging from 15 minutes to 18 hours or more. A preferred solvent for the preparation of the sodio derivative is t-butanol. The reaction of the intermediate sodio derivative with the desired alkyl halide is ordinarily carried out in an inert solvent such as ether, toluene or benzene over a period of time ranging from 15 minutes to 18 hours or more and at the reflux temperature of the reaction mixture. A preferred solvent for this step is also t-butanol. Alkyl halides suitable for the etherification of the N-(β- or γ-aminoalkyl)-β-aminoethanols may be, for example, methyl iodide, ethyl iodide, 2,4-dinitrochlorobenzene, benzyl chloride, phenethyl chloride, β-pyridylmethyl chloride, α-bromopyridine, and the like.

The N-(β- or γ-aminoalkyl)-β-aminoethyl ether derivatives may also be prepared by the treatment of an appropriate N-(β- or γ-aminoalkyl)-β-aminoethyl halide derivative (prepared as described above) with an alkali metal alcoholate. Where the starting material is a dihalide and two molar equivalents of an alkali metal alcoholate are employed, then a diether is obtained. On the other hand, where the starting material is a dihalide and one molar equivalent of an alkali metal alcoholate is employed, then a monoether is obtained. This monoether may be further treated with a different alkali metal alcoholate to give a mixed diether. Ordinarily, this reaction is carried out in an aqueous medium over a period of time ranging from 1 to 6 hours and at temperatures ranging from −10° C. to 200° C. Alkali metal alcoholates suitable for this etherification reaction may be, for example, sodium methylate, sodium ethylate, potassium benzylate, potassium phenethylate, sodium phenolate, sodium p-methoxyphenolate, etc.

The N-(β- or γ-aminoalkyl)-β-aminoethyl esters of the present invention may be prepared by the treatment of an appropriate N-(β- or γ-aminoalkyl)-β-aminoethanol derivative in the form of its mineral acid di-salt with an acid ester, acid chloride, or acid anhydride. Where the starting material is a diol di-salt and two molar equivalents or more of an acid ester, acid chloride, or acid anhydride are employed, then a diester is obtained. On the other hand, where the starting material is a diol di-salt and one molar equivalent of an acid ester, acid chloride, or acid anhydride is employed, then a monoester is obtained. This monoester may be further treated with a different acid ester, acid chloride, or acid anhydride to give a mixed diester. Where both nitrogen atoms in the diamine are tertiary nitrogen atoms, then the use of the diamine starting material in the form of its mineral acid di-salt is not necessary for the preparation of the O-monoacyl or O,O-diacyl derivatives. Ordinarily, the acylation of an appropriate N-(β- or γ-aminoalkyl)-β-aminoethanol derivative with an acid halide or acid anhydride is carried out in an inert solvent such as benzene or toluene over a period of time ranging from 15 minutes to 6 hours and a temperatures ranging from 0° C. to 150° C. Where an acid halide is employed, an acid-acceptor such as pyridine or triethylamine may conveniently be used. Acid halides suitable for the acylation reaction may be, for example, benzoyl chloride, p-chlorobenzoyl chloride, acetyl chloride, propionyl bromide, n-valeryl bromide, and the like. Acid anhydrides suitable for the acylation reaction may be, for example, benzoic anhydride, 3,4-methylenedioxybenzoic anhydride, acetic anhydride, propionic anhydride, isobutyric anhydride, n-valeric anhydride, etc.

The following examples illustrate the preparation and formulation of the novel therapeutic compounds of the present invention, and the compounds so prepared are summarized in Table I below.

TABLE I $$R_2-N(R_1)-CH-CH_2-Y$$
$$|$$
$$Z$$
$$|$$
$$R_3-N-R_4$$

| Example No. | Z | $R_1$ | $R_2$ | $R_3$ | $R_4$ | Y |
|---|---|---|---|---|---|---|
| 1 | $-CH_2CH_2-$ | $-CH_3$ | H | H | $-\underset{CH_3}{CH}-CH_2-OH$ | $-OH$ |
| 2,14 | $-CH_2CH_2-$ | $-C_2H_5$ | H | H | $-\underset{C_2H_5}{CH}-CH_2-OH$ | $-OH$ |
| 3 | $-CH_2CH_2-$ | $-\underset{CH_3}{\overset{CH_3}{CH}}$ | H | H | 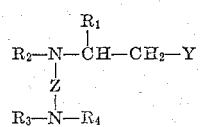 | $-OH$ |
| 5 | $-CH_2CH_2-$ | $-C_2H_5$ | H | H | $-\underset{CH_3}{\overset{CH_3}{CH}}$ | $-OH$ |
| 6 | $-CH_2CH_2-$ | $-C_2H_5$ | $-CH_3$ | $-CH_3$ | $-\underset{C_2H_5}{CH}-CH_2-OH$ | $-OH$ |
| 7 | $-CH_2CH_2-$ | $-C_2H_5$ | $-C_2H_5$ | H | $-\underset{CH_3}{\overset{CH_3}{CH}}$ | $-OH$ |

TABLE I—Continued

| Example No. | Z | R₁ | R₂ | R₃ | R₄ | Y |
|---|---|---|---|---|---|---|
| 9 | $-\overset{\underset{\|}{CH_3}}{CH}CH_2-$ | $-C_2H_5$ | H | H | $-\overset{\underset{\|}{C_2H_5}}{CH}-CH_2-OH$ | $-OH$ |
| 10 | $-CH_2CH_2CH_2-$ | $-C_2H_5$ | H | H | $-\overset{\underset{\|}{C_2H_5}}{CH}-CH_2-OH$ | $-OH$ |
| 11 | $-CH_2CH_2-$ | $-C_2H_5$ | $-CH_2CH_2OH$ | $-CH_2CH_2OH$ | $-\overset{\underset{\|}{C_2H_5}}{CH}-CH_2-OH$ | $-OH$ |
| 12, 13 | $-CH_2CH_2-$ | $-C_2H_5$ | $-C_2H_5$ | $-C_2H_5$ | $-\overset{\underset{\|}{C_2H_5}}{CH}-CH_2-OH$ | $-OH$ |
| 16, 17 | $-CH_2CH_2-$ | $-C_2H_5$ | H | H | $-\overset{\underset{\|}{C_2H_5}}{CH}-CH_2-Cl$ | $-Cl$ |
| 18 | $-CH_2CH_2-$ | $-C_2H_5$ | H | H | $-\overset{\underset{\|}{C_2H_5}}{CH}-CH_2-Br$ | $-Br$ |
| 19 | $-CH_2CH_2-$ | $-CH_3$ | H | H | $-\overset{\underset{\|}{CH_3}}{CH}-CH_2-OCH_3$ | $-OCH_3$ |
| 20, 21, 22 | $-CH_2CH_2-$ | $-C_2H_5$ | H | H | $-\overset{\underset{\|}{C_2H_5}}{CH}-CH_2-OCH_3$ | $-OCH_3$ |
| 23 | $-CH_2CH_2-$ | $-C_2H_5$ | H | H | $-\overset{\underset{\|}{C_2H_5}}{CH}-CH_2-OH$ | $-OCH_3$ |
| 24 | $-CH_2CH_2-$ | $-C_2H_5$ | H | H | $-\overset{\underset{\|}{C_2H_5}}{CH}-CH_2-OC_2H_5$ | $-OC_2H_5$ |
| 24 | $-CH_2CH_2-$ | $-C_2H_5$ | H | H | $-\overset{\underset{\|}{C_2H_5}}{CH}-CH_2-OH$ | $-OC_2H_5$ |
| 25 | $-CH_2CH_2-$ | $-C_2H_5$ | H | H | $-\overset{\underset{\|}{C_2H_5}}{CH}-CH_2-OCH_2C_6H_5$ | $-OCH_2C_6H_5$ |
| 26 | $-CH_2CH_2-$ | $-C_2H_5$ | H | H | $-\overset{\underset{\|}{C_2H_5}}{CH}-CH_2-OC_6H_5$ | $-OC_6H_5$ |
| 27 | $-CH_2CH_2-$ | $-C_2H_5$ | H | H | $-\overset{\underset{\|}{C_2H_5}}{CH}-CH_2-OC_5H_4N$ |  |
| 28 | $-CH_2CH_2-$ | $-C_2H_5$ | $-CH_3$ | $-CH_3$ | $-\overset{\underset{\|}{C_2H_5}}{CH}-CH_2-OCOCH_3$ | $-OCOCH_3$ |
| 29 | $-CH_2CH_2-$ | $-C_2H_5$ | $-CH_3$ | $-CH_3$ | $-\overset{\underset{\|}{C_2H_5}}{CH}-CH_2-OCOC_6H_5$ | $-OCOC_6H_5$ |
| 30 | $-CH_2CH_2-$ | $-C_2H_5$ | $-CH_3$ | $-CH_3$ | $-\overset{\underset{\|}{C_2H_5}}{CH}-CH_2-OCOC_6H_4Cl$ |  |
| 1 | $-CH_2CH_2-$ | $-C_2H_5$ | $-CH_3$ | $-CH_3$ | $-\overset{\underset{\|}{C_2H_5}}{CH}-CH_2-OCO(CH_2)_3CH_3$ | $-O\overset{\overset{O}{\|}}{C}-(CH_2)_3CH_3$ |
| 32 | $-CH_2CH_2-$ | $-C_2H_5$ | $-CH_3$ | $-CH_3$ | $-\overset{\underset{\|}{C_2H_5}}{CH}-CH_2-OCOC_5H_4N$ |  |
| 33 | $-CH_2CH_2-$ | $-C_2H_5$ | H | H | $-\overset{\underset{\|}{C_2H_5}}{CH}-CH_2-OC_6H_3(NO_2)_2$ | 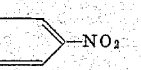 |
| 34 | $-CH_2CH_2-$ | $-C_2H_5$ | H | H | $-\overset{\underset{\|}{C_2H_5}}{CH}-CH_2-OCH_2C_5H_4N$ |  |

Example 1

N-[N'-(α-METHYL-β-HYDROXYETHYL)-β-AMINOETHYL]-β-METHYL-β-AMINOETHANOL

A mixture of 37.7 g. (0.50 mole) of 2-amino-1-propanol and 12.4 g. (0.125 mole) of ethylene dichloride was refluxed for one hour. To the cooled mixture was added to solution of 30 g. (0.55 mole) of sodium methoxide in 75 ml. of methanol and the precipitated sodium chloride was removed by filtration. Distillation gave 11 g. (49% of theory) of a yellow viscous oil, B.P. 150–170° C./0.2 mm. This product crystallized in the receiver and was recrystallized from ethanol (6.8 ml./g.) to yield 2.6 g. of meso base as white crystals, M.P. 137–145° C.

Fractional crystallization from the filtrate gave some additional predominantly meso base but the *dl* base did not readily crystallize. Addition of ethanolic HCl to the filtrate followed by fractional crystallization from methanol gave 2.0 g. of the *dl* dihydrochloride as white crystals, M.P. 184–186.5° C. The meso base was converted to its dihydrochloride which on recrystallization from methanol weighed 3.5 g., M.P. 201.5–204.5° C.

Example 2

N-[N'-(α-ETHYL-β-HYDROXYETHYL)-β-AMINOETHYL]-β-ETHYL-β-AMINOETHANOL

To 227 g. (2.55 moles) of 2-amino-1-butanol was added 100 g. (1.0 mole) of ethylene dichloride. The mixture was heated to reflux and in a few minutes the exothermic reaction required the removal of exterior heating. After 10 minutes, exterior heating was recommenced for an additional 20 minutes. The hot mixture was then poured into a flask, washing with and adding 300 ml. of methanol. To this was added cautiously 84 g. (2.1 moles) of sodium hydroxide in 80 ml. of water. The precipitated sodium chloride was removed by filtration. The excess 2-amino-1-butanol distilled as a light yellow oil at 83–87° C./13 mm. The viscous residue distilled at 165–170° C./0.6 mm. as a light yellow oil which tended to solidify in the air condenser; yield, 108 g. (58% of theory). Recrystallization by dissolving in 80 ml. of hot ethanol, adding about 150 ml. of petroleum ether (B.P. 90–100° C.), and cooling at 5° C. overnight, gave 64 g. of white crystals melting at 128–132.5° C. This, on recrystallization from 100 ml. of 95% ethanol, gave 35 g. of white crystals melting at 134.5–136° C. and a second crop of 10 g. melting at 132.5–134° C. (total yield 45 g., 22% of theory) which is the meso base. The dihydrochloride of this melts at 202–203° C.

From the ethanolic filtrates on addition of 130 ml. of about 4 N ethanolic hydrochloric acid and cooling, there was obtained 55 g. of white crystals melting at 176.5–178° C. and a second crop of 10 g. melting at 171.5–174.5° C. This is the *dl* racemate dihydrochloride.

Example 3

N-[N'-(α-ISOPROPYL-β-HYDROXYETHYL)-β-AMINOETHYL]-β-ISOPROPYL-β-AMINOETHANOL

A solution of 40 g. (0.22 mole) of ethyl *dl* valinate hydrochloride in 100 ml. of pyridine was treated dropwise with stirring and cooling with a solution of 13.97 g. (0.11 mole) of oxalyl chloride in 100 ml. of anhydrous ether over a period of 45 minutes. Sufficient 1 N hydrochloric acid was added to bring the pH to 5 and this solution was extracted several times with ether. The ethereal extract on concentration gave a gum which crystallized from 50 ml. of ethanol on adding 100 ml. of water and cooling to 0° C. The product, 29 g., was a white crystalline solid, M.P. 44°–48° C.

The above oxamide (17.2 g., 0.05 mole), dissolved in 250 ml. of ether, was added dropwise to a solution of 10.0 g. (0.26 mole) of lithium aluminum hydride in 500 ml. of ether followed by a 2 hour refluxing period. Addition of ethyl acetate followed by 200 ml. of 10 N sodium hydroxide gave a clear solution. The ether layer was separated and combined with two additional ether extracts. On concentration of the ethereal extracts, adding ethanolic hydrogen chloride and acetone, 7.2 g. of the dihydrochloride salt as white crystals (47% yield) were obtained, M.P. 216–224° C. Recrystallization from ethanol and water gave 6.6 g. of white needles, M.P. 231.5-233.5° C.

Example 4

β-ISOPROPYLAMINOETHYLCHLORIDE HYDROCHLORIDE

A solution of 48.5 g. (0.47 mole) of β-isopropylaminoethanol in 100 ml. of chloroform was cooled, and a solution of 59 ml. (0.82 mole) of thionyl chloride in 600 ml. of chloroform was added dropwise over 40 minutes with vigorous stirring, keeping the reaction temperature below 10° C. After standing at 5° C. for 1 hour the mixture was allowed to come to room temperature over 3 hours. Most of the chloroform was distilled, 50 ml. of ethanol was added and distilled leaving a black viscous residue which solidified on standing overnight. The residue was dissolved in 200 ml. of boiling ethanol and treated with about 5 g. of Norite. The red filtrate was concentrated to 80 ml. and 180 ml. of acetone was added. After cooling to 0° C. the resulting crystals were filtered and dried in a vacuum oven to give a white product weighing 59 g. (80% yield) and melting at 179.5–188° C. (corr.)

Example 5

N-[N'-(ISOPROPYL)-β-AMINOETHYL]-β-ETHYL-β-AMINOETHANOL

A mixture of 15.8 g. (0.1 mole) of β-isopropylaminoethylchloride hydrochloride and 35.6 g. (0.4 mole) of 2-aminobutanol was heated at reflux for 4 hours. The cooled viscous oil was treated with 100 ml. of 10 N NaOH and the organic layer extracted into benzene. Several additional benzene extractions followed and the combined extracts dried over anhydrous $Na_2CO_3$, concentrated, and the residue distilled. The first fraction collected consisted of 2-aminobutanol, B.P. 80–85° C./15 mm. Further distillation yielded the product as a light yellow oil, 11 g. (63% yield), B.P. 85–86° C./0.005 mm.

Example 6

N-METHYL-N-[N'-METHYL-N'-(α-ETHYL-β-HYDROXYETHYL)-β-AMINOETHYL]-β-ETHYL-β-AMINOETHANOL

To 16.5 g. (0.36 mole) of 98% formic acid was added 10.0 g. (0.048 mole) of N-[N'-(α-ethyl-β-hydroxyethyl)-β-aminoethyl]-β-ethyl-β-aminoethanol in portions, with cooling. Then, 9.0 g. (0.105 mole) of 37% formaldehyde was added and the mixture was heated on the steam bath with considerable effervescence, due to evolution of carbon dioxide during the first hour. Refluxing was continued for an additional seven hours. The solution was cooled and treated with 15 ml. of conc. HCl, and the excess formaldehyde and formic acid was removed by evaporation on the steam bath. The resulting gum was treated with 25% NaOH and the organic layer extracted into benzene. The combined extracts were dried over anhydrous $Na_2CO_3$ and concentrated leaving an oily residue which on distillation under high vacuum yielded the product as a colorless oil, 7.4 g. (67%), B.P. 132–134° C./0.01 mm.

Example 7

N-ETHYL-N-[N'-(ISOPROPYL)-β-AMINOETHYL]-β-ETHYL-β-AMINOETHANOL

A mixture of 25 g. (0.21 mole) of 2-ethylamino-1-butanol and 11.1 g. (0.07 mole) of β-isopropylaminoethyl chloride hydrochloride was heated to 180° C. After 20 minutes of heating a vigorous reaction ensued and the solution turned a deep red. The mixture was refluxed for an additional 18 hours after which the cooled viscous liquid was treated with ca. 30 ml. 10 N NaOH. The insoluble oil was extracted into benzene followed by several successive extractions of the aqueous layer with benzene. The combined extracts were dried over anhydrous $Na_2CO_3$. The benzene solution was concentrated and the residue distilled under reduced pressure to remove excess 2-ethylamino-1-butanol; B.P. 75–85° C./15 mm. Further distillation at 0.03 mm. afforded 7 g. of the desired product, a pale yellow liquid B.P. 82–83° C.

Example 8

N-[1-(HYDROXYMETHYL)PROPYL]-α-[1-(HYDROXYMETHYL)PROPYLAMINO]-PROPIONAMIDE 178.2 g. (2.0 moles) of 2-amino-1-butanol was dissolved in 100 ml. benzene and placed in a 3-necked flask equipped with a dropping funnel, a condenser, and a magnetic stirrer. A solution of 25.0 g. (0.2 mole) of α-chloropropionyl chloride in 50 ml. benzene was added dropwise with cooling and stirring whereupon white fumes were evolved. The solution was heated for one hour, allowing the benzene to escape through the air condenser. The resulting viscous yellow oil was treated with a methanolic solution of KOH (0.4 mole). The white product (KCl) which precipitated was removed by filtration. The filtrate was concentrated to remove the methanol and the residue distilled at reduced pressures to remove the excess 2-aminobutanol, B.P. 80–85° C./15 mm. The residue remaining in the distilling flask was used in Example 9 to prepare N-[N'-($\alpha$-ethyl-$\beta$-hydroxyethyl)-$\beta$-methyl-$\beta$-aminoethyl]-$\beta$-ethyl-$\beta$-aminoethanol.

Example 9

N-[N'-($\alpha$-ETHYL-$\beta$-HYDROXYETHYL)-$\beta$-METHYL-$\beta$-AMINOETHYL]-$\beta$-ETHYL-$\beta$-AMINOETHANOL 15.2 g. (0.4 mole) of lithium aluminum hydride was added to 700 ml. of dry tetrahydrofuran in a 3-necked flask equipped with a condenser, a mechanical stirrer and a dropping funnel, and the suspension was refluxed with stirring for 1 hour. A solution of ca. 46 g. (0.2 mole) of N-[1-(hydroxymethyl) propyl]-$\alpha$-[1-(hydroxymethyl) propylamino]-propionamide in 250 ml. of dry tetrahydrofuran was added slowly to the lithium aluminum hydride suspension. After addition was completed the mixture was refluxed for an additional 16 hours. The excess lithium aluminum hydride was decomposed by successive additions of 15 ml. of water, 11 ml. of 20% NaOH, and 50 ml. of water. The white precipitate was removed by filtration and the filtrate concentrated by distillation at atmospheric pressure. The residue was distilled under reduced pressure giving 30 g. of product, B.P. 149° C./0.01–0.02 mm.

Example 10

N-[N'-($\alpha$-ETHYL-$\beta$-HYDROXYETHYL)-$\gamma$-AMINOPROPYL]-$\beta$-ETHYL-$\beta$-AMINOETHANOL 20.2 g. (0.1 mole) of 1,3-dibromopropane was mixed with 44.57 g. (0.5 mole) of 2-amino-1-butanol and on slight heating a vigorous reaction occurred. Dense white fumes were liberated and the colorless solution turned deep red. The solution was heated for an additional 2 hours, then cooled to give a viscous liquid. The mixture was neutralized by treatment with excess 10 N NaOH and the insoluble base extracted into ethyl acetate. The combined ethyl acetate extracts were dried over anhydrous Na$_2$CO$_3$. The extract was concentrated and the resulting residue distilled at 15 mm. to remove the excess 2-amino-1-butanol, B.P. 80–85° C. By further distillation of the residue, a yellow viscous oil boiling at 130–170° C./0.08 mm. was collected. (Mixture of dl and meso isomers of the desired compound). The oil was dissolved in ethanol and ethanolic HCl added to pH 1. Addition of acetone to the acid solution caused precipitation of 9.4 g. of a dihydrochloride salt which on recrystallization from a 1:4 ethanol-acetone mixture gave 8.8 g. of white crystals, M.P. 139–142° C. and assigned the meso configuration. Concentration of the acidic mother liquor gave a gummy, low-melting dihydrochloride salt which could not be purified. The dihydrochloride salt was converted to the corresponding base by treatment with excess aqueous alkali. A yellow oil (1.7 g.) was isolated by distillation, B.P. 150–170° C./0.3 mm. This product is the dl racemate.

Example 11

N-($\beta$-HYDROXYETHYL)-N-[N'-($\beta$-HYDROXYETHYL)-N'-($\alpha$-ETHYL-$\beta$-HYDROXYETHYL)-$\beta$-AMINOETHYL]-$\beta$-ETHYL-$\beta$-AMINOETHANOL To 4.08 g. (0.02 mole) of dl N-[N'-($\alpha$-ethyl-$\beta$-hydroxyethyl)-$\beta$-aminoethyl]-$\beta$-ethyl-$\beta$-aminoethanol dissolved in 25 ml. of dimethylformamide was added 2.95 ml. (0.04 mole) of ethylenebromohydrin. The mixture was refluxed for four hours at which time a quantitative test for ionic bromine indicated complete reaction. The mixture was concentrated under reduced pressure to a viscous oil.

Example 12

N-ETHYL-N-[N'-ETHYL-N'-($\alpha$-ETHYL-$\beta$-HYDROXYETHYL)-$\beta$-AMINOETHYL]-$\beta$-ETHYL-$\beta$-AMINOETHANOL A mixture of 33 g. (0.28 mole) of 2-ethylamino-1-butanol and 13.2 g. (0.07 mole) of ethylene dibromide was heated to reflux for 2 hours with a vigorous initial reaction. To the cooled mixture 30 ml. of 10 N NaOH was added and the resulting oil layer was extracted with benzene. After drying over anhydrous Na$_2$CO$_3$ the benzene and excess 2-ethylamino-1-butanol were distilled off and the residue, 12 g., distilled at 90–130° C./0.02 mm. On redistillation, the product was obtained at 125–140° C./0.07 mm.

Example 13

N-ETHYL-N-[N'-ETHYL-N'-($\alpha$-ETHYL-$\beta$-HYDROXYETHYL)-$\beta$-AMINOETHYL]-$\beta$-ETHYL-$\beta$-AMINOETHANOL An alternate method of preparing the product of Example 12 is to treat N-[N'-($\alpha$-ethyl-$\beta$-hydroxyethyl)-$\beta$-aminoethyl]-$\beta$-ethyl-$\beta$-aminoethanol with excess acetic anhydride to obtain the N,N',O,O'-tetra-acetyl derivative. By reduction of this intermediate with lithium aluminum hydride as in Examples 3 and 9, the desired N,N'-diethyl derivative is obtained, the O-acetyl functions being removed during the reaction.

Example 14

N-[N'-($\alpha$-ETHYL-$\beta$-HYDROXYETHYL)-$\beta$-AMINOETHYL]-$\beta$-ETHYL-$\beta$-AMINOETHANOL To 6.0 g. (0.03 mole) of 30% aqueous glyoxal was added 9.2 g. of 2-aminobutanol (with moderate heat evolution) and 30 ml. of absolute ethanol. A total of 3.7 g. (0.1 mole) of sodium borohydride was added in portions over 10 minutes. The reaction mixture, after the vigorous reaction had subsided, was heated for 30 minutes. On adding water and extracting with chloroform, the meso isomer, M.P. 131–134° C., was isolated on cooling. The dl isomer was isolated as the dihydrochloride salt, M.P. 172–175° C. on acidifying the filtrate with ethanolic HCl.

Example 15

A mixture of 30 parts of dl N-[N'-($\alpha$-ethyl-$\beta$-hydroxyethyl)-$\beta$-aminoethyl]-$\beta$-ethyl-$\beta$-aminoethanol dihydrochloride, 15 parts of starch, and 1 part of magnesium stearate was thoroughly blended and then screened through a 60 mesh screen. The resulting powder was tabletted in an automatic tabletting machine whereby suitable 500 mg. scored white tablets were obtained.

Example 16

N,N'-BIS-($\alpha$-CHLOROMETHYLPROPYL)ETHYLENEDIAMINE

To a suspension of 27.7 g. of dextro 2,2'-(ethylenediimino)-di-1-butanol dihydrochloride in 30 ml. of chloroform was added a mixture of 82.7 g. of thionyl chloride in 20 ml. of chloroform. On warming to 60° C. a vigorous gas evolution occurred giving a clear solution. This was refluxed for one hour when the solvent and excess thionyl chloride were removed under reduced pressure. To the residue was added 80 ml. of ethanol and 50 ml. of methanol. Upon heating, the residue dissolved and the resulting solution, after filtration and cooling, gave white crystals of dextro N,N'-bis-($\alpha$-chloromethylpropyl)ethylenediamine, M.P. 232–237° C. (dec.). Recrystallization from ethanol raised the melting point to 236–238° C. (dec).

Example 17

N,N'-BIS-($\alpha$-CHLOROMETHYLPROPYL)ETHYLENEDIAMINE

In place of the dextro starting material of Example 16, there was employed an equimolar quantity of the meso isomer whereby the meso N,N'-bis($\alpha$-chloromethylpropyl)ethylenediamine dihydrochloride was obtained as white crystal solids, M.P. 231–233° C. (dec.).

Example 18

N,N'-BIS-(α-BROMOMETHYLPROPYL)ETHYLENE-DIAMINE

To a suspension of dextro 2,2'-(ethylenediimino)-di-1-butanol dihydrobromide in 10 ml. of chloroform was added 16.1 g. of thionyl bromide. The dark mixture was heated to reflux for 15 minutes when a clear red solution was obtained. The solvent and excess thionyl bromide were removed under reduced pressure. The residue was crystallized from 15 ml. of ethanol whereby white crystals of dextro N,N'-bis-(α-bromomethylpropyl)ethylenediamine dihydrobromide were obtained.

Example 19

N,N'-BIS-(α-METHOXYMETHYLETHYL)ETHYLENE-DIAMINE

A mixture of 17.83 g. of 2-amino-1-methoxypropane and 4.94 g. of ethylene chloride was heated at reflux for 5 hours. The reaction mixture was basified by addition of 25 ml. of 10 N sodium hydroxide, and the organic layer was extracted with five 25 ml. portions of benzene. The benzene was removed from the extract by distillation at 78–82° C. The fraction containing the desired product boiled at 126–128° C./13–15 mm.

Example 20

N,N'-BIS-(α-METHOXYMETHYLPROPYL)ETHYLENE-DIAMINE

To a solution of 21.0 g. of dextro 2,2'-(ethylenediimino)-di-1-butanol in 225 ml. of t-butanol was added a suspension of 9.50 g. of sodium hydride (51.5% NaH in oil) in 30 ml. of ether and the reaction mixture was heated to reflux for 1 hour whereby a clear solution was obtained. This was cooled to 35° C. with some solid forming. Dropwise addition of a solution of 26.97 g. of methyl iodide in 25 ml. of t-butanol caused some temperature rise and a clearing of the solution. The solution was refluxed for 18 hours and the solvent removed under vacuum. Addition of 80 ml. of 6 N hydrochloric acid gave a deep red solution which was extracted with benzene. The aqueous phase was made strongly alkaline with sodium hydroxide causing separation of a red oil. Extraction with benzene followed by drying with anhydrous sodium carbonate and distillation gave a fraction, B.P. 152–163° C./13 mm. Acidification of the distillate with ethanolic hydrochloric acid, followed by the addition of a large volume of acetone, gave white crystals of dextro N,N'-bis-(α-methoxymethylpropyl)ethylenediamine dihydrochloride, M.P. 181–183° C.

Example 21

N,N'-BIS-(α-METHOXYMETHYLPROPYL)ETHYLENE-DIAMINE

Example 20 was repeated but an equimolar amount of the levo isomer was employed in place of the dextro starting material of that example. There was obtained the levo N,N'-bis-(α-methoxymethylpropyl)ethylenediamine dihydrochloride as white crystals, M.P. 192–193° C.

Example 22

N,N'-BIS-(α-METHOXYMETHYLPROPYL)ETHYLENE-DIAMINE

By replacing the dextro starting material employed in Example 20 by an equimolar quantity of the meso isomer and following substantially the same procedure described in Example 20, there was obtained the meso N,N'-bis-(α-methoxymethylpropyl)ethylenediamine as a colorless oil, B.P. 144–157° C./13 mm.

Example 23

N-[N'-(α-ETHYL-β-METHOXYETHYL)-β-AMINOETHYL]-β-ETHYL-β-AMINOETHANOL

The procedure of Example 20 was repeated substituting half the amounts of sodium hydride and methyl iodide employed in that example. There was thus obtained the monomethyl ether, B.P. 180–186° C./23 mm.

Example 24

N,N'-BIS-(α-ETHOXYMETHYLPROPYL)ETHYLENEDIAMINE AND N-[N'-(α-ETHYL-β-ETHOXYETHYL)-β-AMINOETHYL]-β-ETHYL-β-AMINOETHANOL

The procedure of Example 20 was repeated substituting an equimolar amount of ethyl iodide for the methyl iodide employed in that example. There was thus obtained two fractions on distillation. The lower boiling fraction was dextro N,N'-bis-(α-ethoxymethylpropyl)ethylenediamine, B.P. 157–160° C./8 mm. The higher boiling fraction was dextro N-[N'-(α-ethyl-β-ethoxyethyl)-β-aminoethyl]-β-ethyl-β-aminoethanol, B.P. 160–165° C./8 mm.

Example 25

N,N'-BIS-(α-BENZYLOXYMETHYLPROPYL)ETHYLENEDIAMINE

By replacing the methyl iodide employed in Example 20 by an equimolar quantity of benzyl chloride and following substantially the same procedure described in Example 20, there was obtained the dextro N,N'-bis-(α-benzyloxymethylpropyl)ethylenediamine, B.P. 215–225° C./0.12 mm.

Example 26

N,N'-BIS-(α-PHENOXYMETHYLPROPYL)ETHYLENEDIAMINE

To a solution of 20.0 g. of phenol in 55 ml. of water and 24 ml. of 10 N sodium hydroxide was added dropwise, with stirring and keeping the temperature at 5–10° C., a solution of 6.28 g. of dextro N,N'-bis-(α-chloromethylpropyl)ethylenediamine dihydrochloride in 20 ml. of water. The resulting solution was allowed to warm to room temperature over a period of 40 minutes and was then refluxed for four hours. Upon cooling, the reaction mixture was basified with 10 g. of sodium hydroxide and then extracted with three 50 ml. portions of ether. The ether was removed from the combined extracts and the residue was distilled whereupon dextro N,N'-bis-(α-phenoxymethylpropyl)ethylenediamine was obtained as a colorless oil.

By replacing the methyl iodide employed in Example 20 by an equimolecular quantity of diphenyliodonium bromide and following substantially the same procedure described in Example 20, there is also obtained the dextro N,N'-bis-(α-phenoxymethylpropyl)ethylenediamine.

Example 27

N,N'-BIS-[α-(α-PYRIDOXYMETHYL)PROPYL]ETHYLENEDIAMINE

Example 20 was repeated but employing an equimolar amount of α-bromopyridine in place of the methyl iodide of that example. There was thus obtained the dextro N,N'-bis-[α-(α-pyridoxymethyl)propyl]ethylenediamine as a tan oil, B.P. 160–210° C./0.05 mm. This was converted to its tetrahydrochloride, M.P. 169–171° C.

Example 28

N-METHYL-N-[N'-METHYL-N'-(α-ETHYL-β-HYDROXYETHYL)-β-AMINOETHYL]-β-ETHYL-β-AMINOETHANOL DIACETYL ESTER

To a solution of 4.64 g. of dextro N-methyl-N-[N'-methyl-N'-(α-ethyl-β-hydroxyethyl)-β-aminoethyl]-β-ethyl-β-aminoethanol in 25 ml. of benzene was added a solution of 16.3 g. of acetic anhydride in 25 ml. of benzene. After the exothermic reaction had subsided, the reaction mixture was concentrated under reduced pressure. The black residue was dissolved in ether and added to a solution of 11.08 g. of oxalic acid dihydrate in 12 ml. of ether. The solid which had precipitated was dissolved in a boiling mixture of 8 ml. of water and 250 ml. of methanol, decolorized with charcoal, diluted with 100 ml. of ether and cooled. The dextro N-methyl-N-

[N' - methyl - N' - (α - ethyl - β - hydroxyethyl) - β-aminoethyl]-β-ethyl-β-aminoethanol diacetyl ester oxalate was obtained as white crystals, M.P. 164–165° C.

*Example 29*

N-METHYL-N-[N'-METHYL-N'-(α-ETHYL - β - HYDROXYETHYL)-β-AMINOETHYL] - β - ETHYL-β-AMINOETHANOL DIBENZOYL ESTER

A solution of 21.8 g. of dextro N-methyl-N-[N'-methyl-N' - (α - ethyl - β - hydroxyethyl) - β - aminoethyl] - β-ethyl-β-aminoethanol in 25 ml. of benzene was added slowly to a suspension of 30.8 g. of benzoyl chloride in 22.2 g. of triethylamine and 100 ml. of benzene. The reaction mixture was refluxed for one hour, the suspended solids removed by filtration, and the filtrate concentrated to a dark oil. This residue was dissolved in 300 ml. of ether and saturated with hydrogen chloride whereby a white crystalline solid precipitated. After heating with 1 liter of acetone, the while solid was collected by filtration and dried. Recrystallization from 700 ml. of ethanol gave the dextro N-methyl-N-[N'-methyl-N'-(α-ethyl-β-hydroxyethyl)-β-aminoethyl]-β-ethyl-β-aminoethanol dibenzoyl ester dihydrochloride, M.P. 222–224° C.

*Example 30*

N-METHYL-N-[N'-METHYL-N'-(α-ETHYL - β - HYDROXYETHYL) - β - AMINOETHYL]-β-ETHYL-β-AMINOETHANOL DI-(4-CHLORO)BENZOYL ESTER

By replacing the benzoyl chloride employed in Example 29 by an equimolar quantity of 4-chlorobenzoyl chloride and following substantially the same procedure described in Example 29, there was obtained the dextro N-methyl-N-[N'-methyl-N'-(α-ethyl - β - hydroxyethyl)-β-aminoethyl]-β - ethyl - β - aminoethanol di - (4-chloro) benzoyl ester dihydrochloride as a white crystalline solid, M.P. 225° C. (dec.).

*Example 31*

N-METHYL-N-[N'-METHYL-N'-(α-ETHYL - β - HYDROXYETHYL) - β - AMINOETHYL]-β-ETHYL-β-AMINOETHANOL DI-N-VALERYL ESTER

The procedure of Example 28 was repeated substituting an equimolar amount of n-valeric anhydride for the acetic anhydride employed in that example. There was thus obtained the while crystalline dextro N-methyl-N-[N'-methyl - N'-(α - ethyl-β-hydroxyethyl)-β-aminoethyl]-β-ethyl-β-aminoethanol di-n-valeryl ester di-*d*-tartrate.

*Example 32*

N-METHYL-N-[N'-METHYL-N'-(α-ETHYL - β - HYDROXYETHYL) - β - AMINOETHYL]-β-ETHYL-β-AMINOETHANOL DIISONICOTINOYL ESTER

Example 29 was repeated but employing an equimolar amount of isonicotinoyl chloride hydrochloride in place of the benzoyl chloride of that example plus two additional equivalents of triethylamine. There was thus obtained the dextro N-methyl-N-[N'-methyl-N'-(α-ethyl-β-hydroxyethyl)-β-aminoethyl]-β-ethyl - β - aminoethanol diisonicotinoyl ester as the which crystalline tetrahydrochloride.

*Example 33*

N,N'-BIS-[α-(2,4-DINITROPHENOXYMETHYL)PROPYL] ETHYLENEDIAMINE

By replacing the methyl iodide employed in Example 20 by an equimolar quantity of 2,4-dinitrochlorobenzene and following substantially the same procedure described in Example 20, there was obtained the yellow crystalline dextro N,N'-bis-[α-(2,4 - dinitrophenoxymethyl)propyl] ethylenediamine.

*Example 34*

N,N'-BIS-[α-(β-PYRIDYLMETHOXYMETHYL)PROPYL] ETHYLENEDIAMINE

Example 20 was repeated but employing an equimolar amount of β-pyridylmethyl chloride hydrochloride in place of the methyl iodide of that example. There was thus obtained the dextro N,N'-bis-[α-(β-pyridylmethoxymethyl)propyl]ethylenediamine as the white crystalline tetrahydrochloride.

What is claimed is:

1. A compound selected from the group consisting of N-[N-(α-ethyl - β - hydroxyethyl)-β-aminoethyl]-β-ethyl-β-aminoethanol and the non-toxic acid-addition salts thereof.

2. A compound selected from the group consisting of N-methyl-N-[N'-methyl - N' - (α-ethyl-β-hydroxyethyl)-β-aminoethyl]-β-ethyl-β-aminoethanol and the non-toxic acid-addition salts thereof.

3. A compound selected from the group consisting of N-ethyl - N - [N'-ethyl-N'-(α-ethyl-β-hydroxyethyl)-β-aminoethyl]-β-ethyl-β-aminoethanol and the non-toxic acid-addition salts thereof.

References Cited by the Examiner
UNITED STATES PATENTS 2,248,729  7/41  Ulrich et al. _____ 260—584 X
2,913,496  11/59  Cluff _____ 260—584

CHARLES B. PARKER, *Primary Examiner.*

IRVING MARCUS, *Examiner.*